(12) United States Patent
Allais et al.

(10) Patent No.: US 11,204,605 B1
(45) Date of Patent: Dec. 21, 2021

(54) AUTONOMOUS VEHICLE CONTROLLED BASED UPON A LIDAR DATA SEGMENTATION SYSTEM

(71) Applicant: GM GLOBAL TECHNOLOGY OPERATIONS LLC, Detroit, MI (US)

(72) Inventors: Andrea Allais, San Francisco, CA (US); Micah Christopher Chambers, Oakland, CA (US); William Gongshu Xie, San Francisco, CA (US); Adam Samuel Cadien, San Francisco, CA (US); Elliot Branson, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 706 days.

(21) Appl. No.: 16/054,065

(22) Filed: Aug. 3, 2018

(51) Int. Cl.

| | |
|---|---|
| *G05D 1/00* | (2006.01) |
| *G05D 1/02* | (2020.01) |
| *B60W 10/06* | (2006.01) |
| *B60W 10/20* | (2006.01) |
| *G06N 3/08* | (2006.01) |
| *B60W 10/18* | (2012.01) |
| *G01S 17/931* | (2020.01) |
| *G01S 7/48* | (2006.01) |

(52) U.S. Cl.
CPC ........... *G05D 1/0088* (2013.01); *B60W 10/06* (2013.01); *B60W 10/18* (2013.01); *B60W 10/20* (2013.01); *G01S 17/931* (2020.01); *G05D 1/0212* (2013.01); *G05D 1/0238* (2013.01); *G06N 3/08* (2013.01); *G01S 7/4802* (2013.01); *G05D 2201/0212* (2013.01)

(58) Field of Classification Search
None
See application file for complete search history.

(56) References Cited

U.S. PATENT DOCUMENTS

| | | | | |
|---|---|---|---|---|
| 8,605,998 | B2 * | 12/2013 | Samples | ............ G06K 9/00201 382/159 |
| 8,825,260 | B1 | 9/2014 | Silver et al. | |
| 8,886,387 | B1 * | 11/2014 | Agarwal | ............ G06K 9/00791 701/28 |
| 8,948,501 | B1 * | 2/2015 | Kim | .................... G06K 9/00711 382/159 |
| 9,360,554 | B2 * | 6/2016 | Retterath | ................ G01S 17/42 |
| 9,672,446 | B1 | 6/2017 | Vallespi-Gonzalez | |
| 10,152,771 | B1 * | 12/2018 | Li | .......................... G01S 7/4808 |
| 10,345,447 | B1 * | 7/2019 | Hicks | ...................... G01S 7/486 |
| 10,436,884 | B2 * | 10/2019 | Wu | ......................... G01S 17/86 |
| 10,445,599 | B1 * | 10/2019 | Hicks | ................... G05D 1/0246 |
| 10,486,485 | B1 * | 11/2019 | Levinson | ........... B60G 17/0165 |

(Continued)

*Primary Examiner* — Jonathan M Dager
(74) *Attorney, Agent, or Firm* — Medley, Behrens & Lewis, LLC (57) ABSTRACT

An autonomous vehicle is described herein. The autonomous vehicle includes a lidar sensor system. The autonomous vehicle additionally includes a computing system that executes a lidar segmentation system, wherein the lidar segmentation system is configured to identify objects that are in proximity to the autonomous vehicle based upon output of the lidar sensor system. The computing system further includes a deep neural network (DNN), where the lidar segmentation system identifies the objects in proximity to the autonomous vehicle based upon output of the DNN.

20 Claims, 8 Drawing Sheets

(56) References Cited

U.S. PATENT DOCUMENTS

| | | | |
|---|---|---|---|
| 10,627,512 B1* | 4/2020 | Hicks | G06T 5/50 |
| 10,699,167 B1* | 6/2020 | Dowdall | G06K 9/6263 |
| 10,884,131 B1* | 1/2021 | Allais | G01S 17/86 |
| 10,884,411 B1* | 1/2021 | Allais | G05D 1/0212 |
| 10,928,830 B1* | 2/2021 | Tran | G06K 9/00791 |
| 2009/0310867 A1* | 12/2009 | Matei | G06T 7/11 382/195 |
| 2014/0118716 A1* | 5/2014 | Kaganovich | G06T 7/254 356/4.01 |
| 2016/0026184 A1 | 1/2016 | Stainvas Olshansky et al. | |
| 2016/0379366 A1* | 12/2016 | Shah | G06T 7/38 345/419 |
| 2017/0132334 A1* | 5/2017 | Levinson | G06F 30/20 |
| 2017/0300059 A1* | 10/2017 | Rust | G01S 7/003 |
| 2018/0074203 A1* | 3/2018 | Zermas | G06K 9/00805 |
| 2018/0075320 A1* | 3/2018 | Zermas | G06T 7/248 |
| 2018/0136332 A1* | 5/2018 | Barfield, Jr | G06T 7/70 |
| 2018/0188039 A1* | 7/2018 | Chen | B60W 40/06 |
| 2018/0188041 A1* | 7/2018 | Chen | G06K 9/00791 |
| 2018/0203113 A1* | 7/2018 | Taylor | G06K 9/00791 |
| 2018/0203124 A1* | 7/2018 | Izzat | G01S 17/86 |
| 2018/0203447 A1* | 7/2018 | Wyffels | G01S 17/42 |
| 2018/0293447 A1* | 10/2018 | Kawano | G06T 7/73 |
| 2018/0307921 A1* | 10/2018 | Vallespi-Gonzalez | G01S 17/89 |
| 2018/0348346 A1* | 12/2018 | Vallespi-Gonzalez | G01S 7/4802 |
| 2018/0349746 A1* | 12/2018 | Vallespi-Gonzalez | G01S 17/89 |
| 2019/0137287 A1* | 5/2019 | Pazhayampallil | G01C 21/32 |
| 2019/0179023 A1* | 6/2019 | England | G05D 1/0231 |
| 2019/0204834 A1* | 7/2019 | Harrison | G01S 17/58 |
| 2019/0234745 A1* | 8/2019 | Lee | G05D 1/0055 |
| 2019/0258251 A1* | 8/2019 | Ditty | G06K 9/00805 |
| 2019/0258737 A1* | 8/2019 | Wang | G06K 9/00791 |
| 2019/0266741 A1* | 8/2019 | Uehara | G06T 7/12 |
| 2019/0271767 A1* | 9/2019 | Keilaf | G01S 7/4863 |
| 2019/0272665 A1* | 9/2019 | X | G06T 15/08 |
| 2019/0310378 A1* | 10/2019 | Ho | G01S 17/931 |
| 2019/0319851 A1* | 10/2019 | Eckart | H04L 41/142 |
| 2019/0340775 A1* | 11/2019 | Lee | G06N 20/00 |
| 2019/0353784 A1* | 11/2019 | Toledano | G01S 17/86 |
| 2019/0387185 A1* | 12/2019 | Hicks | H04N 5/33 |
| 2019/0387216 A1* | 12/2019 | Hicks | H04N 13/275 |
| 2020/0180612 A1* | 6/2020 | Finelt | B60W 30/09 |
| 2020/0249674 A1* | 8/2020 | Dally | G05D 1/0221 |
| 2020/0257301 A1* | 8/2020 | Weiser | G05D 1/0214 |
| 2020/0341466 A1* | 10/2020 | Pham | G05D 1/0246 |
| 2020/0410254 A1* | 12/2020 | Pham | G06K 9/726 |

* cited by examiner

AUTONOMOUS VEHICLE CONTROLLED BASED UPON A LIDAR DATA SEGMENTATION SYSTEM

BACKGROUND

An autonomous vehicle is a motorized vehicle that can operate without human conduction. An exemplary autonomous vehicle includes a plurality of sensor systems, such as, but not limited to, a lidar sensor system, a camera sensor system, and a radar sensor system, amongst others, wherein the autonomous vehicle operates based upon sensor signals output by the sensor systems.

Conventionally, autonomous vehicles are configured to identify locations of different objects in a driving environment based upon different sensor signals. For example, a radar system can identify a range from the autonomous vehicle to another vehicle in the driving environment. In another example, an object recognition system may be configured to receive images output by a camera and to identify relative positions of objects captured in the images.

In some situations, however, it may be difficult to determine what objects are at which locations based upon the sensor signals output by the sensor systems of the autonomous vehicle. For instance, in the driving environment of the autonomous vehicle, similar yet distinct objects may be positioned close together (e.g., a group of several pedestrians standing together at a street corner). In a lidar point cloud representative of the driving environment, it may be difficult to determine whether two points are representative of distinct objects or a same object among similar, closely-spaced objects. Conventionally, algorithms based upon human-generated rules have been used to perform segmentation of a lidar point cloud to identify objects and their locations in the driving environment. For example, an algorithm may identify two points in a lidar point cloud as belonging to a same object based upon the points being within 50 centimeters of one another. This conventional approach is subject to developer bias and/or incorrect intuition, may not be robust to variations in the driving environment, and can result in possible errors with respect to object identification by the autonomous vehicle.

SUMMARY

The following is a brief summary of subject matter that is described in greater detail herein. This summary is not intended to be limiting as to the scope of the claims.

Described herein are various technologies pertaining to controlling operation of an autonomous vehicle. With more specificity, described herein are various technologies pertaining to segmentation of a lidar point cloud, wherein the lidar point cloud is representative of positions of objects in the driving environment of the autonomous vehicle at one or more points in time. With still more specificity, a lidar data segmentation system is described herein, wherein the lidar data segmentation system comprises a neural network that is trained to output a plurality of features pertaining to each of the points in the lidar point cloud. The lidar data segmentation system assigns labels to the points based upon the features, the labels indicating whether points belong to a same object.

In an example, an autonomous vehicle includes a lidar sensor system that comprises at least one lidar sensor, and a lidar segmentation system. The lidar sensor system outputs lidar data based on sensor signals received from the at least one lidar sensor, where the lidar data is indicative of positions of objects in the driving environment of the autonomous vehicle at one or more times. In an exemplary embodiment, the lidar data comprises a three-dimensional lidar point cloud, wherein each point in the point cloud indicates a three-dimensional position of an object or surface of an object in the driving environment of the autonomous vehicle. The lidar sensor system outputs the lidar data to the lidar segmentation system, whereupon the lidar segmentation system generates a segmentation of the lidar data. By way of example, the segmentation indicates which points in the lidar point cloud belong to same objects in the driving environment.

The lidar segmentation system, in connection with generating the segmentation of the lidar data, receives the lidar data from the lidar sensor system and identifies various input features with respect to each of the points represented in the lidar data. By way of example, and not limitation, input features for a point in a lidar point cloud can include distance to a next-closest point in the point cloud, angle formed by the point and adjacent points in the point cloud, mean and variance of position relative to a local neighborhood of points in the point cloud, etc. The lidar segmentation system receives the input features for each of the points and provides the input features as input to a deep neural network (DNN). The DNN is trained to output a plurality of output features that are indicative of which points in the lidar point cloud correspond to same objects in the driving environment of the autonomous vehicle. The lidar segmentation system assigns labels to points in the point cloud based upon the output feature values output by the DNN for each of the points, the labels indicating objects to which the points belong. In a non-limiting example, the DNN outputs, for each point in the point cloud, a vector of output feature values. The lidar segmentation system computes distance values between the output vectors of points in the point cloud, and assigns the labels to the points based upon the computed distances. For instance, responsive to determining that the distance between the output vectors of two points in the point cloud is below a threshold distance, the lidar segmentation system assigns respective labels to the two points indicating that the points are representative of a same object in the driving environment.

In some exemplary embodiments, the lidar segmentation system, prior to outputting lidar segmentation data to control systems of the autonomous vehicle, performs further processing based upon the labels assigned to the points in the lidar data. In an example, the lidar segmentation system generates a proposed segmentation based upon the labels assigned to the points, where the proposed segmentation indicates groups of points representative of a same object, wherein each of the groups represents a different object in the driving environment. The lidar segmentation system then evaluates points in the proposed segmentation based upon the groups to which points are assigned. By way of further example, the lidar segmentation system can evaluate each point against other points in its group, and can reassign points to different groupings based on such evaluation. For instance, the lidar segmentation can remove a point from a segmentation group responsive to determining that the distance between the point and the next-closest point in the group is above a threshold distance. The lidar segmentation system then outputs a final segmentation to a control system of the autonomous vehicle, whereupon the control system controls operation of the vehicle based upon the final segmentation. The lidar segmentation approach described herein improves over conventional algorithmic approaches to identifying objects in lidar data by reducing segmentation errors associated with rules of thumb reflected in conventional algorithmic approaches to lidar segmentation, and improving execution speed over conventional segmentation algorithms.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to controlling operation of an autonomous vehicle based upon lidar segmentation data generated through use of a DNN are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Figure 1:
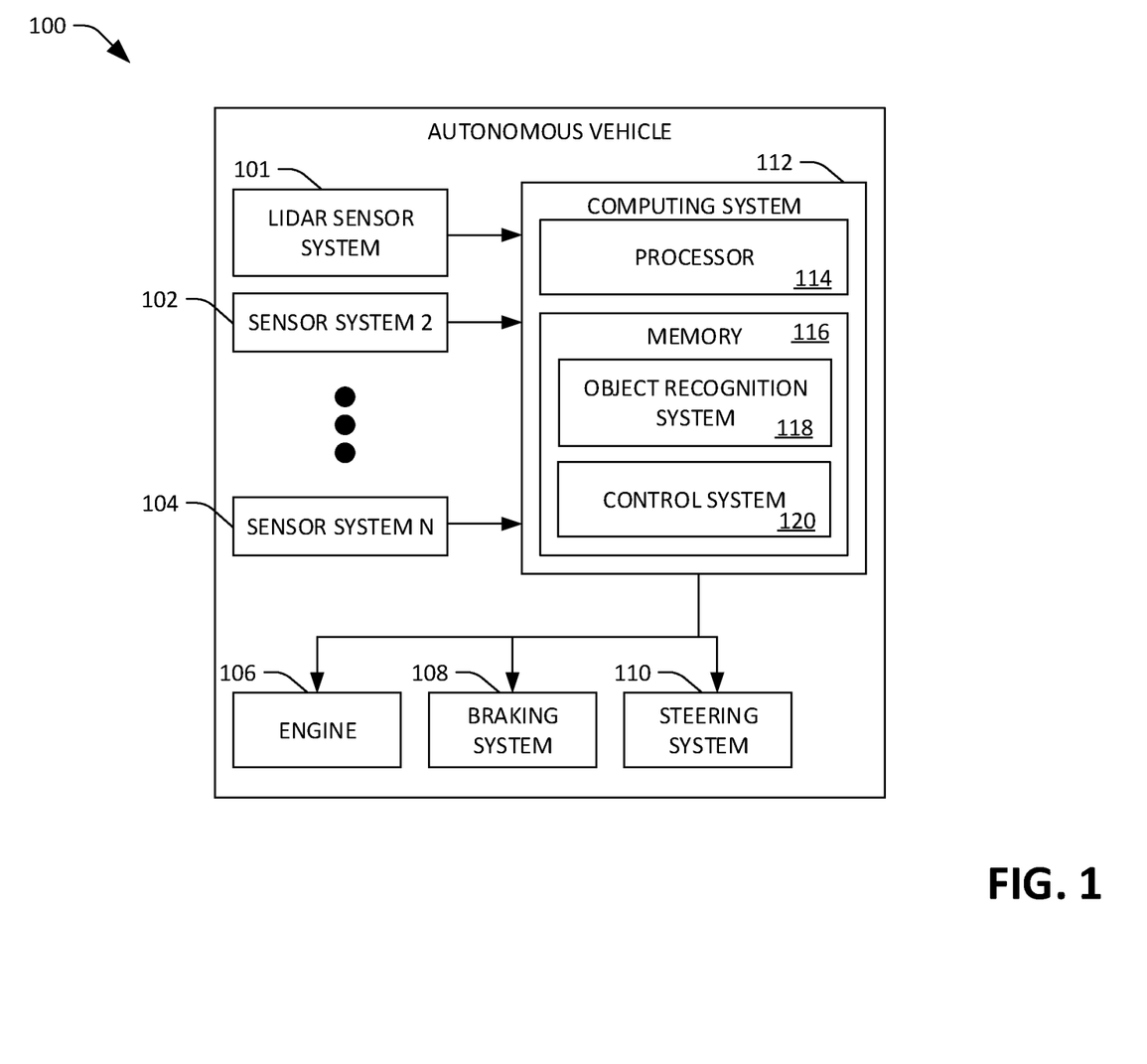
FIG. 1 illustrates an exemplary autonomous vehicle.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a lidar sensor system 101 and a plurality of additional sensor systems 102-104 (a second sensor system 102 through an Nth sensor system 104). The sensor systems 102-104 may be of different types and are arranged about the autonomous vehicle 100. For example, the second sensor system 102 may be a radar sensor system and the Nth sensor system 104 may be a camera (image) system. Other exemplary sensor systems include GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include but are not limited to, an engine 106, a braking system 108, and a steering system 110. The engine 106 may be an electric engine or a combustion engine. The braking system 108 can include an engine brake, brake pads, actuators, a regenerative braking system, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 101-104 and is further in communication with the engine 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

Figure 2:
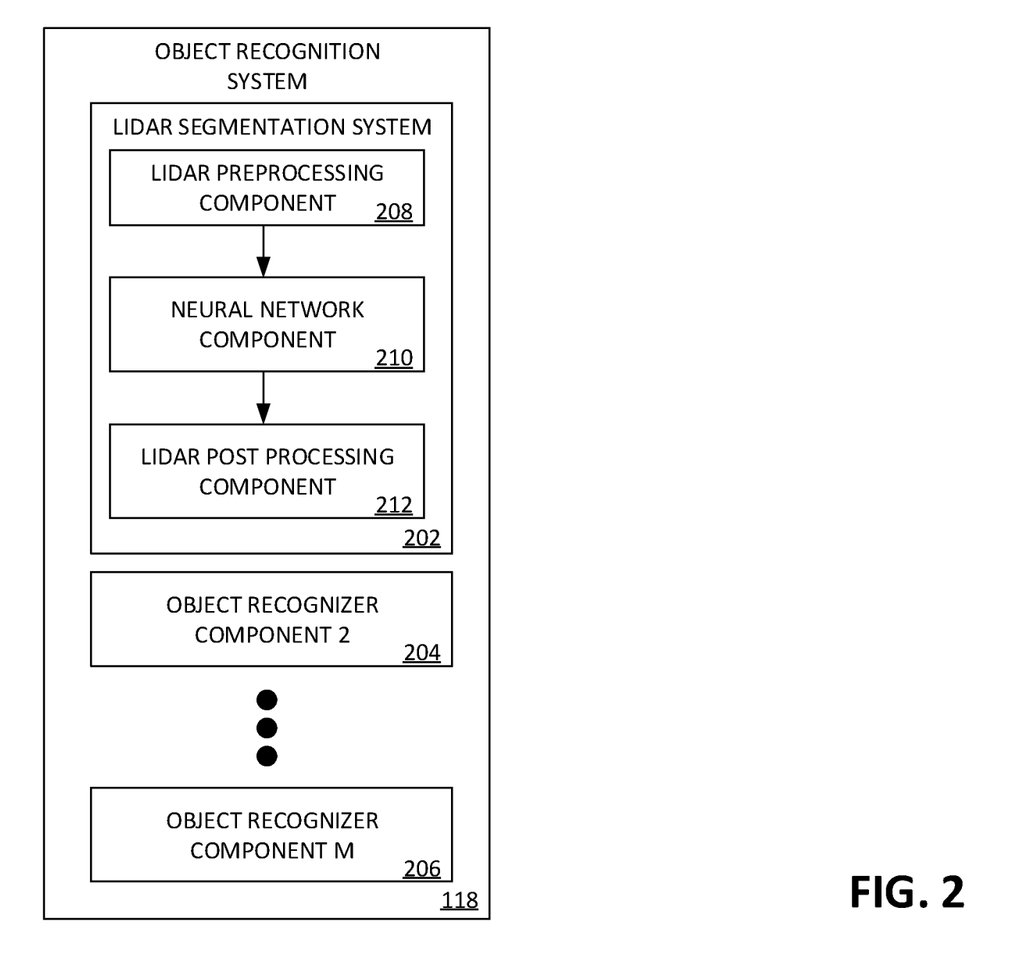
FIG. 2 is a functional block diagram of an exemplary object recognition system included within an autonomous vehicle.

The memory 116 comprises an object recognition system 118 that is configured to identify objects (in proximity to the autonomous vehicle 100) captured in sensor signals output by the sensor systems 101-104. As will be described in greater detail below (and referring briefly to FIG. 2), the object recognition system 118 includes a lidar segmentation system 202, and may further include a plurality of additional object recognition components 204-206 (a second objection recognition component 204 through an Mth objection recognition component 206), wherein the lidar segmentation system 202 and the objection recognition components 204-206 are configured to output data indicative of positions and/or predefined types of objects in a driving environment of the autonomous vehicle 100. These predefined types of objects can include, but are not limited to, pedestrian, bike, car, truck, bus, and static (unknown), where the type "static"

can represent telephone poles, construction equipment, etc. Each of the object recognizer components 202-204 independently generates output based upon at least one sensor signal. For instance, the lidar segmentation system 202 outputs data indicative of positions of objects in the driving environment of the autonomous vehicle 100 based upon lidar data output by the lidar sensor system 101. In further examples, the second object recognizer component 204 outputs data indicative of types of objects based upon images output by a camera, the Mth object recognizer component outputs data indicative of ranges to objects based upon radar signals, etc.

The lidar segmentation system 202 further comprises a lidar preprocessing component 208, a neural network component 210, and a lidar postprocessing component 212. The lidar segmentation system 202 receives lidar data from the lidar sensor system 101, wherein the lidar data is indicative of positions of surfaces of a plurality of objects in a driving environment of the autonomous vehicle 100. The lidar preprocessing component 208 performs various processing operations over the lidar data and outputs a plurality of input features to the neural network component 210.

The memory 118 additionally includes a control system 120 that is configured to receive output of the object recognition system 118, and is further configured to control at least one of the mechanical systems of the autonomous vehicle 100 (the engine 106, the brake system 108, and/or the steering system 110) based upon the output of the object recognition system 118.

Figure 3A:
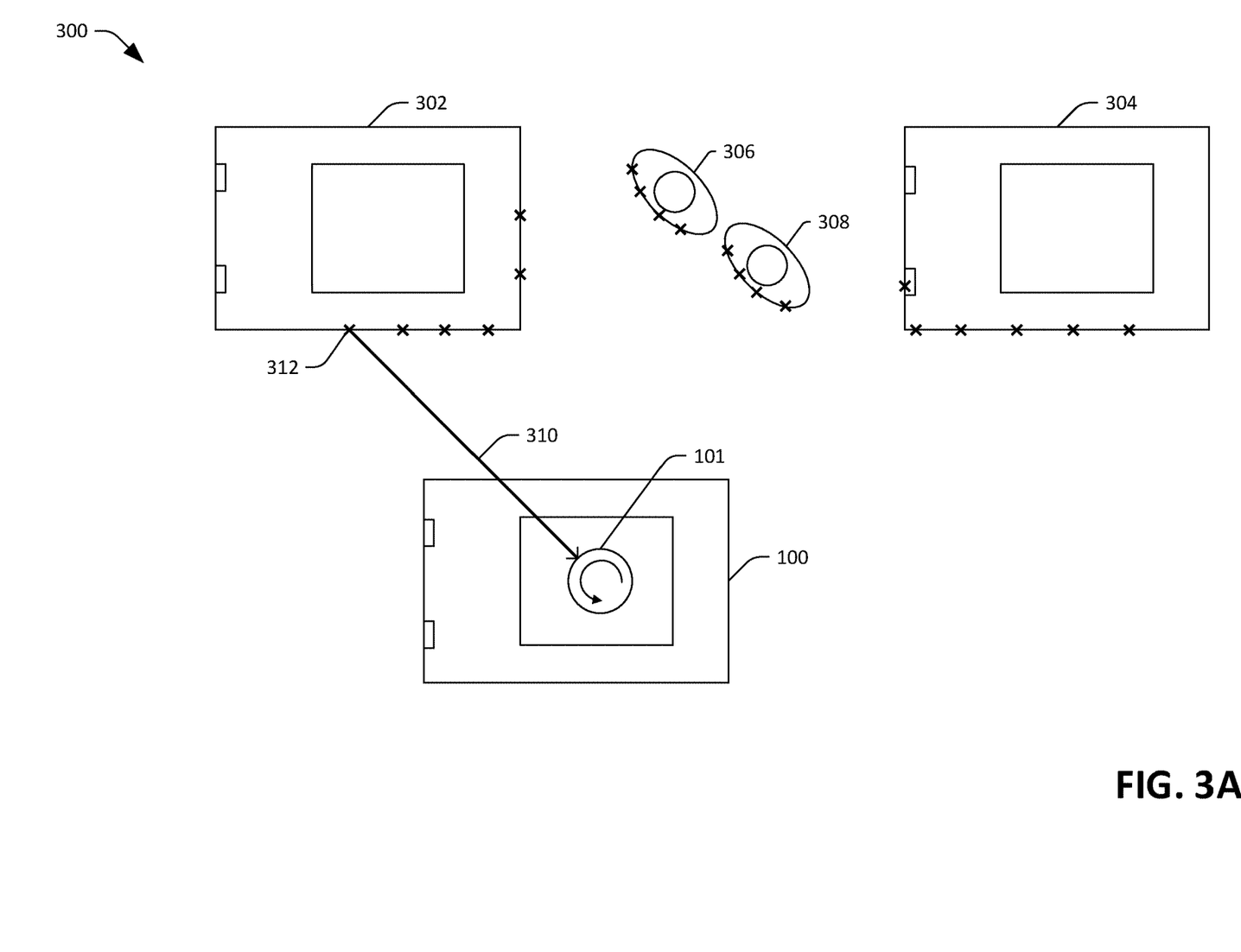
FIG. 3A is a top-down view of an exemplary driving environment of an autonomous vehicle.
Figure 3B:
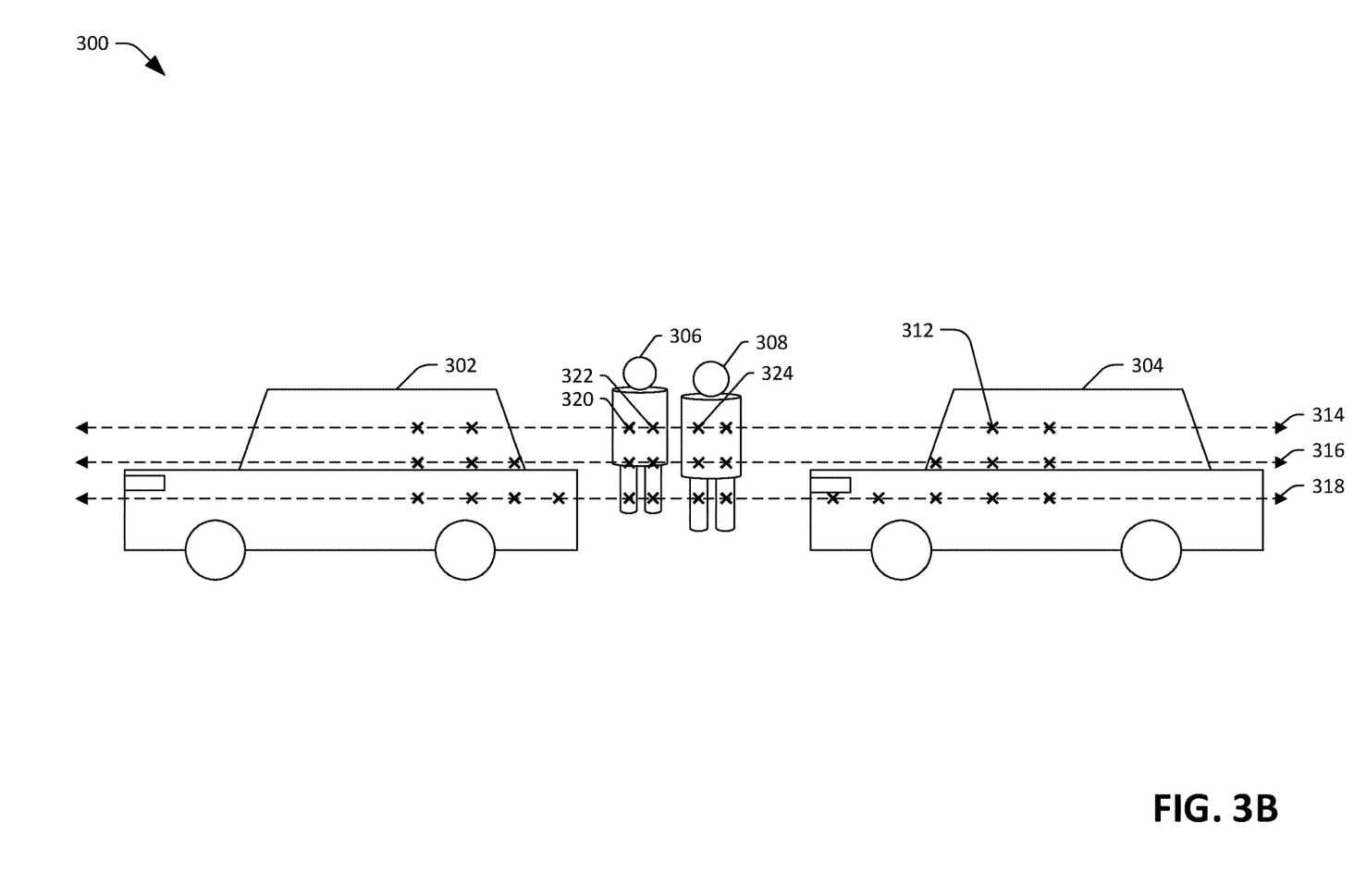
FIG. 3B is a side view of the exemplary driving environment depicted in FIG. 3A.

Exemplary operation of the autonomous vehicle 100 is now set forth. FIGS. 3A and 3B depict different views of an exemplary driving environment 300 in which the autonomous vehicle 100 operates. With reference now to FIG. 3A, the autonomous vehicle 100 is depicted in the driving environment 300, wherein the driving environment includes a first vehicle 302, a second vehicle 304, and two pedestrians 306, 308 standing between the first vehicle 302 and the second vehicle 304. The autonomous vehicle 100 emits a laser beam 310 into the driving environment 300 (e.g., by way of the lidar sensor system 101). The laser beam 310 is scanned 360° around the vehicle 100, and impinges upon the various objects 302-308 in the environment 300. The lidar sensor system 101 receives reflections of the beam 310, and based upon such reflections outputs data indicative of positions of a plurality of points of intersection 312 of the beam 310 with the objects 302-308 in the driving environment 300. By way of example, the lidar sensor system 101 outputs data indicating a three-dimensional position of each of the points 312 (e.g., relative to the autonomous vehicle 100, relative to a point of reference in the driving environment 300 or outside of the driving environment 300, etc.).

It is to be understood that while a single laser beam 310 and a plurality of points of intersection 312 of the beam 310 with objects 302-308 are depicted in FIG. 3A, the lidar sensor system 101 can emit a plurality of laser beams into a driving environment of the autonomous vehicle 100. For instance, and referring now to FIG. 3B, a side view of the objects 302-308 in the driving environment 300 is depicted. In exemplary embodiments, the lidar sensor system 101 emits a plurality of laser beams into the driving environment of the vehicle 100, wherein each of the beams has a different angular alignment with respect to a horizontal reference plane of the vehicle 100. Further, each of a plurality of sensors in the lidar sensor system 101 may be aligned with a different respective lidar beam emitted by the lidar sensor system 101, such that the lidar sensor system 101 outputs data indicative of a plurality of points of intersection for each of the plurality of beams over a period of time. As depicted in FIG. 3B, the plurality of laser beams scan across the objects 302-308 in the driving environment 300 and intersect the objects along scan lines 314-318. Each of the points 312 where a laser beam of the lidar sensor system 101 intersects one of the objects 302-308 in the driving environment lies along one of the scan lines 314-318. Hence, each of the plurality of lidar sensors in the lidar sensor system 101 outputs data indicative of a point of intersection of a respective laser beam with various objects in the driving environment 300 along a respective scan line. A lidar point cloud output by the lidar sensor system 101 can therefore be considered a rastered image of objects in the driving environment, comprising as many scan lines as lasers are included in the lidar sensor system 101. It is to be appreciated that over the period of a 360° scan of a driving environment of the autonomous vehicle 100, the lidar sensor system 101 can output data indicative of positions of a larger number of points than are depicted in FIGS. 3A and 3B (e.g., tens of thousands of points, hundreds of thousands of points, millions of points, etc.).

Referring again to FIG. 2, the lidar segmentation system 202 receives a lidar point cloud from the lidar sensor system 101, wherein the point cloud is indicative of positions of points on surfaces of the objects 302-308 (and other objects that may be present) in the driving environment 300 of the vehicle 100 (e.g., as described above with respect to FIG. 3). The lidar preprocessing component 208 performs an analysis over the points in the point cloud to identify various features relative to each of the points in the point cloud. By way of example, the lidar preprocessing component 208 parameterizes the point cloud according to a training scheme used to learn the neural network component 210. For instance, the lidar preprocessing component 208 can compute, for each of the points in the point cloud, a distance to a next-closest point in the point cloud, a distance from the point to the autonomous vehicle 100, a number of points within a threshold distance of the point, etc., where such features are provided as input to a DNN during training of the DNN (e.g., as described below with respect to FIG. 4). The preprocessor component 208 then provides these features as input features to the neural network component 210 for each of the points in the point cloud.

The neural network component 210 comprises a DNN that has a plurality of layers including an input layer, a plurality of hidden layers (e.g., greater than 10 layers, greater than 50 layers, greater than 100 layers, etc.), and an output layer. Responsive to receipt of input features for a point in the lidar point cloud at the input layer of the DNN, the input features are propagated through the hidden layers of the DNN. The DNN is configured to output, for each of the points in the point cloud, a vector of output features. By way of example, the vector of output features can be a vector of dimension n, wherein n is a number of nodes in the output layer of the DNN. The output features are indicative of whether two points in the lidar cloud represent a same object in the driving environment 300. In an exemplary embodiment, and as discussed below in greater detail with respect to FIG. 4, the DNN is learned such that a distance between 1) a first vector of features that represents a first point and 2) a second vector of features that represents a second point is small when the points represent a same object in the driving environment and large when the points represent different objects in a driving environment of the autonomous vehicle 100. Hence, in the exemplary embodiment, the output features output by the output layer of the DNN are not indicative of probabilities as in conventional neural network classifiers. Furthermore, it is to be understood that each of the output features need not be representative of a specific, distinct physical feature of the points to which it pertains.

The lidar post processing component 212 receives the vectors of output features from the neural network component 210 and outputs a final segmentation that indicates which points are representative of same objects in the driving environment 300. In various embodiments, the lidar post processing component 212 identifies that two points are representative of a same object based upon determining that a distance between their respective vectors of output features is below a threshold. In one exemplary embodiment, the threshold is a pre-defined threshold value. In an exemplary embodiment wherein the lidar sensor system 101 outputs a rastered lidar point cloud to the lidar segmentation system 202, the lidar post processing component 212 computes the distance between output vectors of each adjacent point in each raster scan line. In other words, for each point in the point cloud, the lidar post processing component 212 computes a distance between its vector of output features and the vector of output features of each of the two adjacent points in the raster scan line that includes the point. In the exemplary embodiment, when the distance between the output feature vectors of the adjacent points is below a predefined threshold the lidar post processing component 212 assigns labels to adjacent points in each raster scan line indicating that the points represent a same object in the driving environment 300. When the distance between the output feature vectors of the adjacent points is above a predefined threshold, the lidar post processing component 212 can assign labels indicating that the points represent different objects.

By way of an example, and referring again to FIG. 3B, three adjacent points 320-324 are shown along the upper scan line 314. The points 320-324 can be represented by output feature vectors U, V, and W, respectively. The lidar post processing component 212 can be configured to evaluate the point 322 against adjacent points 320, 324 in the scan line 314 (i.e., adjacent points in lidar data output by a same laser-sensor pair in the lidar sensor system 101). The lidar post processing component 212 computes a distance d(U, V) between the output feature vector V of the point 322 and the output feature vector U of the point 320. If the distance d(U, V) is less than a threshold distance value, the lidar post processing component 212 assigns labels to the points 320, 322 indicating that the points represent a same object. Similarly, the lidar post processing component 212 computes a distance d(U, W) between the output feature vector W of the point 324 and the output feature vector U of the point 322. If the distance d(U, W) is greater than the threshold distance value, the lidar post processing component 212 assigns labels to one or both of the points 322, 324 indicating that the points 322, 324 represent different objects. For example, the lidar post processing component 212 can assign a first label to the point 320, a second label to the point 322, and a third label to the point 324. The first label and the second label can be indicative of a first object, wherein the first label and the second label being assigned to the points 320, 322, respectively, indicates that the points 320, 322 are representative of the first object. The third label can be indicative of a second object, where the third label being assigned to the point 324 indicates that the point 324 is representative of the second object.

It is to be understood that the lidar post processing component 212 can compute a distance between the output feature vectors of two points in the lidar point cloud according to any of a number of distance algorithms. In an exemplary embodiment, the lidar post processing component 212 computes a Euclidean distance between the output feature vectors of two points in connection with determining whether the points are representative of a same object in a driving environment of the autonomous vehicle. In other exemplary embodiments, the lidar post processing component 212 uses the largest difference between corresponding features in two output feature vectors as the distance between the vectors. By way of example, the lidar post processing component 212 can identify the distance between a vector $U=[u_1, u_2, \ldots u_n]$ and a vector $V=[v_1, v_2, \ldots v_n]$ as being the largest of $|u_1-v_1|, |u_2-v_2|, \ldots |u_n-v_n|$. Other suitable ways of evaluating a distance between vectors in connection with determining whether two points in a lidar point cloud are representative of a same object are also contemplated. A method used by the lidar post processing component 212 for computing a distance between two output feature vectors can be based upon a training scheme used to learn the DNN. For instance, if the DNN is learned such that two points in the lidar point cloud are likely to represent a same object when the Euclidean distance between their output feature vectors is small, then the lidar post processing component 212 can use the Euclidean distance between output feature vectors in connection with determining whether two points in a lidar point cloud are representative of a same object in a driving environment of the autonomous vehicle.

Subsequent to assigning labels to points in the point cloud, the lidar post processing component 212 generates a proposed segmentation for the points based upon the labels. The proposed segmentation comprises data indicating, for each of the points, a group to which the point belongs, wherein each group is taken to be representative of an object in the driving environment of the autonomous vehicle 101. In some embodiments, the proposed segmentation is output by the lidar segmentation system 202 to the object recognition system 118, whereupon the object recognition system 118 can track objects in the driving environment or identify types of objects in the driving environment based at least in part upon the proposed segmentation (and/or data output by the other object recognizer components 204-206). Subsequently, the control system 120 of the vehicle 100 can output control signals to at least one of the engine 106, the braking system 108, or the steering system 110 based upon the objects tracked or identified by the objection recognition system 118 (based on the proposed lidar segmentation output by the lidar segmentation system 202).

In other embodiments, the lidar post processing component 212 performs further processing of the proposed segmentation prior to outputting a segmentation to the object recognition system 118. Ideally, the proposed segmentation includes exactly one group for each object in the driving environment that is represented in the lidar sensor data output by the lidar sensor system 101. However, it is to be understood that due to non-ideal performance of the lidar segmentation system 202, the proposed segmentation can include more groups than there are objects in the driving environment or fewer groups than there are objects. Further, a point may be assigned to a group that represents a first object when in fact the point is representative of a different object in the driving environment of the vehicle 100.

The lidar post processing component 212 can analyze characteristics of the groups of points in the proposed segmentation to determine that a point in the group may not be representative of the object represented by the group. In an example, the lidar post processing component 212 determines whether to keep a first point in a first group of points that is representative of a first object or to assign the first point to a different group of points that is representative of an object other than the first object. In the example, the lidar post processing component 212 can compute various characteristics of the points in the first group and compare the first point to those characteristics.

For instance, the lidar post processing component 212 can compute mean and variance values of the output features of the points in the first group (e.g., as indicated by the output feature vectors output by the DNN). The lidar post processing component 212 can compare the output features of the first point to the computed mean and variance values of the output features of the first group of points and can exclude the first point from the first group if the output features of the first point deviate too much from the mean of the first group. By way of example, the lidar post processing component 212 can exclude the first point from the first group (e.g., by assigning a label to the first point indicating that the first point does not belong to the first group) responsive to determining that at least one of the output features of the first point is greater than a threshold number of standard deviations (e.g., greater than two standard deviations, greater than three standard deviations, etc.) away from the mean value of the output feature for points in the first group. In other examples, the lidar post processing component 212 can exclude the first point from the first group based upon the first point being farther than a pre-defined threshold distance away from a next-closest point in the first group. In still other examples, the lidar post processing component 212 can exclude the first point from the first group based upon determining that an angle formed by the first point and two other nearby points in the first group (e.g., adjacent points along a same scan line in the lidar point cloud). It is to be understood that the lidar post processing component 212 can exclude a point from a group of points based on other characteristics of the point relative to the group of points.

The lidar post processing component 212 can evaluate each point in the point cloud or a subset of points in the point cloud against the proposed segmentation according to the techniques described above. For points that are determined to be unlikely to represent the object associated with their assigned group in the proposed segmentation, the lidar post processing component 212 assigns labels indicating that the points are not part of their assigned group in the proposed segmentation. The lidar post processing component 212 can subsequently assign the excluded points to other groups in the proposed segmentation to generate a final segmentation of the lidar point cloud. In exemplary embodiments, the lidar post processing component 212 assigns each of the excluded points to another group based upon any or all of distance to a next-closest point, angle formed by the point with other points in a group, variation of output features of the point relative to mean values of output features in a group, etc. The lidar post processing component 212 outputs the final segmentation of the lidar point cloud to the object recognition system 118, whereupon the object recognition system 118 outputs data pertaining to positions of objects in the driving environment of the vehicle 100 based upon the final segmentation of the lidar point cloud. The control system 120 of the autonomous vehicle 100 outputs control signals to the mechanical systems 106-110 of the autonomous vehicle 100 based upon the output of the object recognition system 118, such that the autonomous vehicle is controlled based at least in part upon the final segmentation of the lidar point cloud generated by the lidar segmentation system 202.

Figure 4:
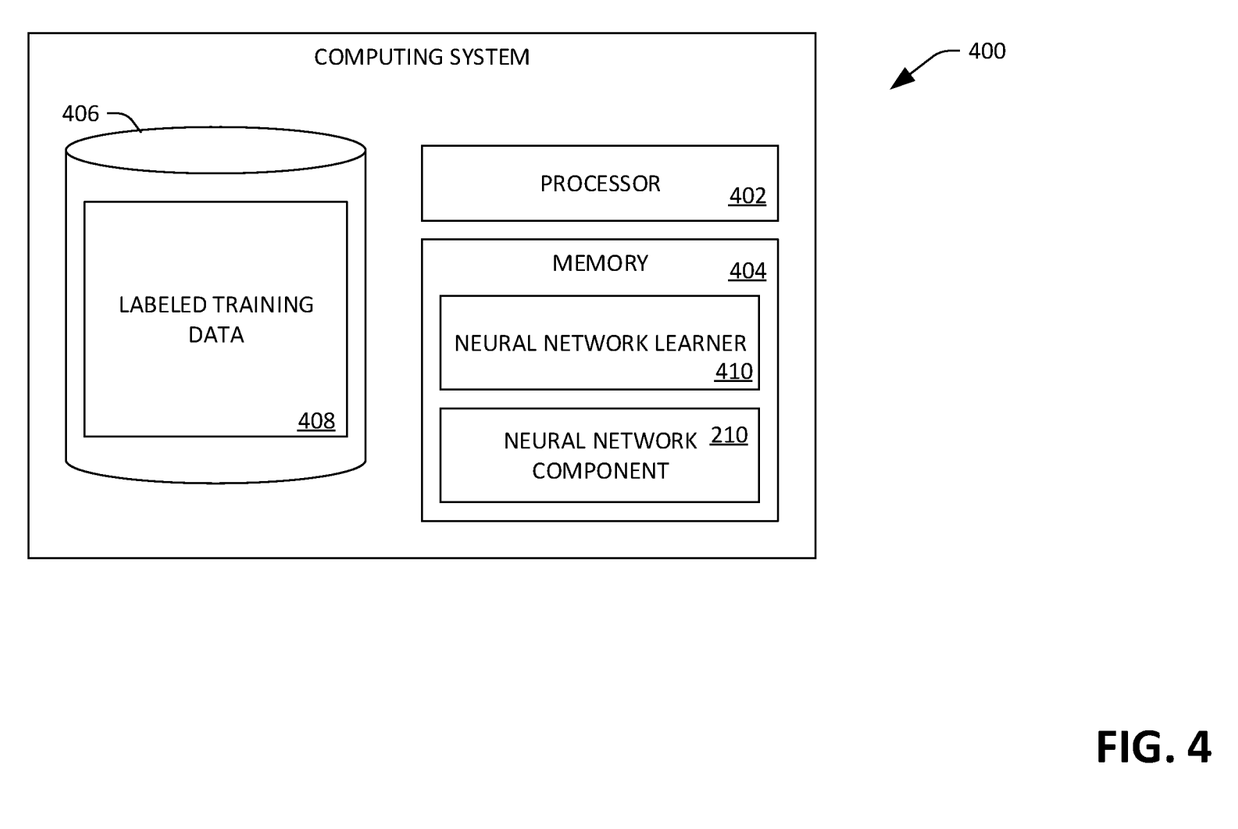
FIG. 4 is a functional block diagram of an exemplary system that is configured to learn a neural network component included in the object recognition system depicted in FIG. 2.

With reference now to FIG. 4, an exemplary computing system 400 that is configured to learn the neural network component 210 is illustrated. The computing system 400 includes a processor 402 and memory 404, wherein the memory 404 includes instructions that are executed by the processor 402. The computing system 400 additionally includes a data store 406 that comprises labeled training data 408. The memory 404 includes a neural network learner 410 that learns the neural network component 210. The neural network learner 410 receives the labeled training data 408, wherein the labeled training data 408 comprises lidar point cloud data (e.g., parameterized as described above with respect to input features of the DNN), wherein the lidar point cloud data includes ground truth data indicating which points are representative of same objects in the lidar point cloud data. The neural network learner 410 learns the neural network component 210 such that the distance between vectors of output features for points representative of a same object is smaller than the distance between vectors of output features for points representative of different objects. While not shown, the neural network component 210 can be validated based upon a test training data set, which is also labeled, to ensure that the neural network component 210 produces outputs with acceptable characteristics (e.g., such that distances between output feature vectors are small for points that represent same objects and large for points that represent different objects).

Figure 5:
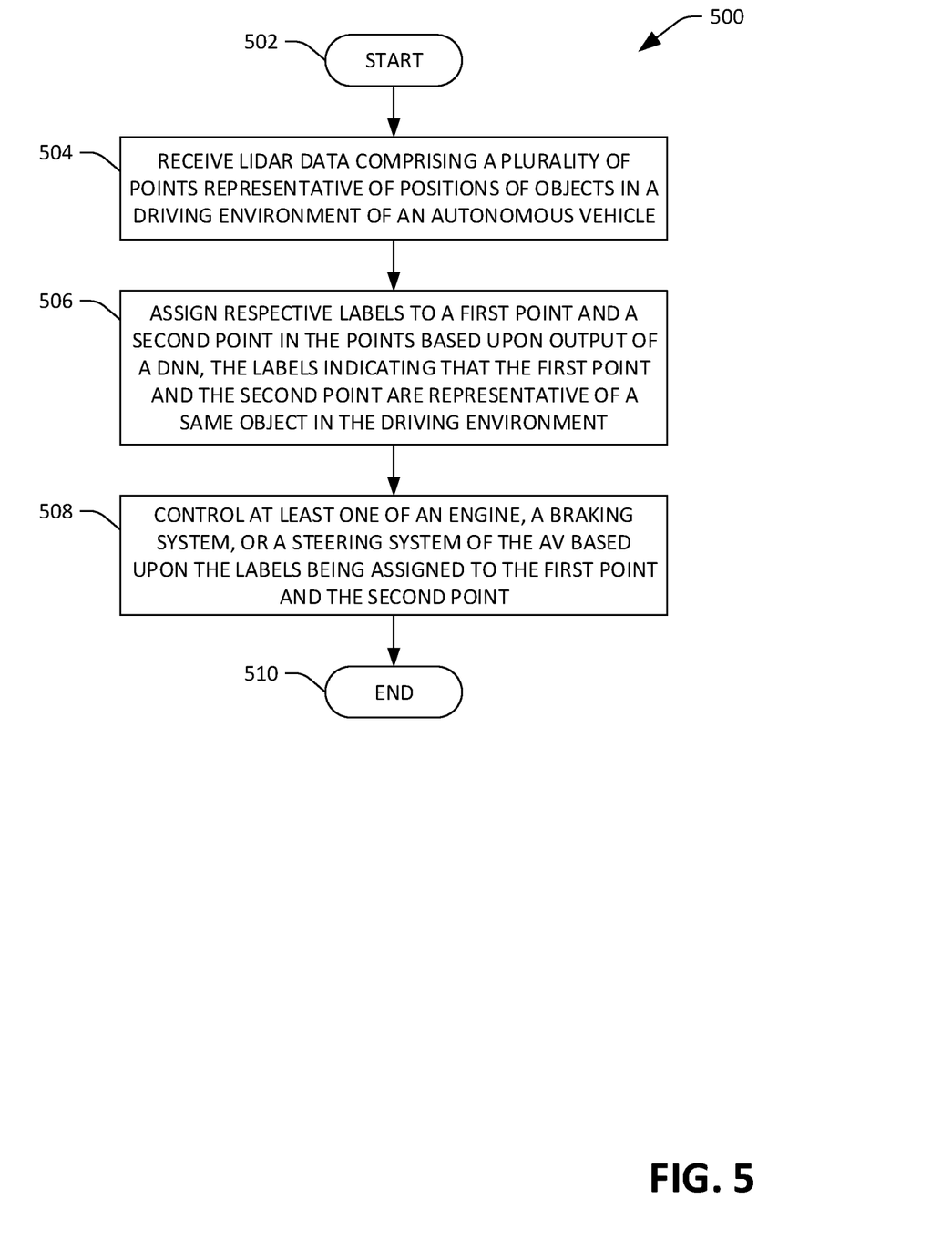
FIG. 5 is a flow diagram illustrating an exemplary methodology for controlling operation of a mechanical system of an autonomous vehicle based upon output of a lidar segmentation system.
Figure 6:
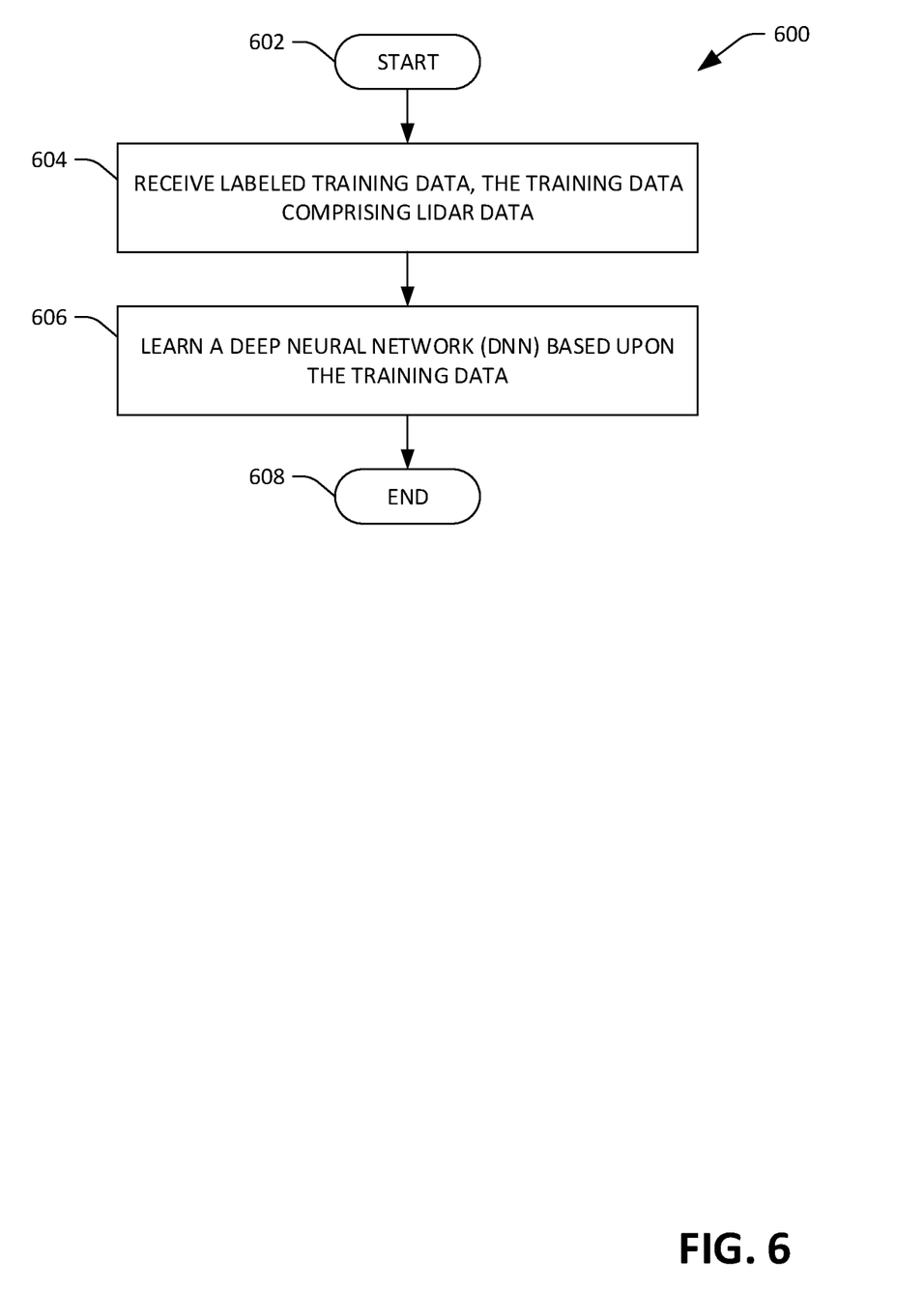
FIG. 6 is a flow diagram illustrating an exemplary methodology for learning a neural network to be included in an object recognition system of an autonomous vehicle.

FIGS. 5 and 6 illustrate exemplary methodologies relating to controlling an autonomous vehicle based upon data output by a lidar data segmentation system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for controlling operation of an autonomous vehicle is illustrated. The methodology 500 starts at 502, and at 504 lidar data is received, wherein the lidar data comprises a plurality of points representative of positions of objects in a driving environment of an autonomous vehicle. At 506, respective labels are assigned to a first point and a second point in the points based upon output of a DNN. The labels indicate that the first point and the second point are representative of a same object in the driving environment of the autonomous vehicle. By way of example, the DNN generates a first vector of output features for the first point and a second vector of output features for the second point. Responsive to determining that a distance from the first vector to the second vector is below a pre-defined threshold, the labels are assigned to the first point and the second point indicating that the first point and the second point are representative of a same object. At 508, at least one of an engine, a braking system, or a steering system of the autonomous vehicle is controlled based upon the labels being assigned to the first point and the second point. For example, an object recognition system of the autonomous vehicle can generate a prediction of future behavior of the object in the driving environment based upon the first point and the second point being locations of the object, and can control steering of the autonomous vehicle based upon such prediction. The methodology 500 completes at 510.

Turning now to FIG. 6, an exemplary methodology 600 that facilitates learning a DNN is illustrated, wherein the DNN is configured for use in a lidar segmentation system of an autonomous vehicle. The methodology 600 starts at 602, and at 604 labeled training data is received, wherein the training data comprises labeled lidar point cloud data. At 606, a DNN is learned based upon the training data. The DNN is configured such that responsive to receiving a point in a lidar point cloud as input (e.g., when the DNN receives a vector of input features representative of the point at an input layer of the DNN), the DNN outputs a vector of output features pertaining to the point. The DNN is learned at 606 such that a distance between the output feature vectors of two points is smaller when the two points are representative of a same object in the driving environment of an autonomous vehicle than when the two points are representative of different objects. The methodology 600 completes at 608.

Figure 7:
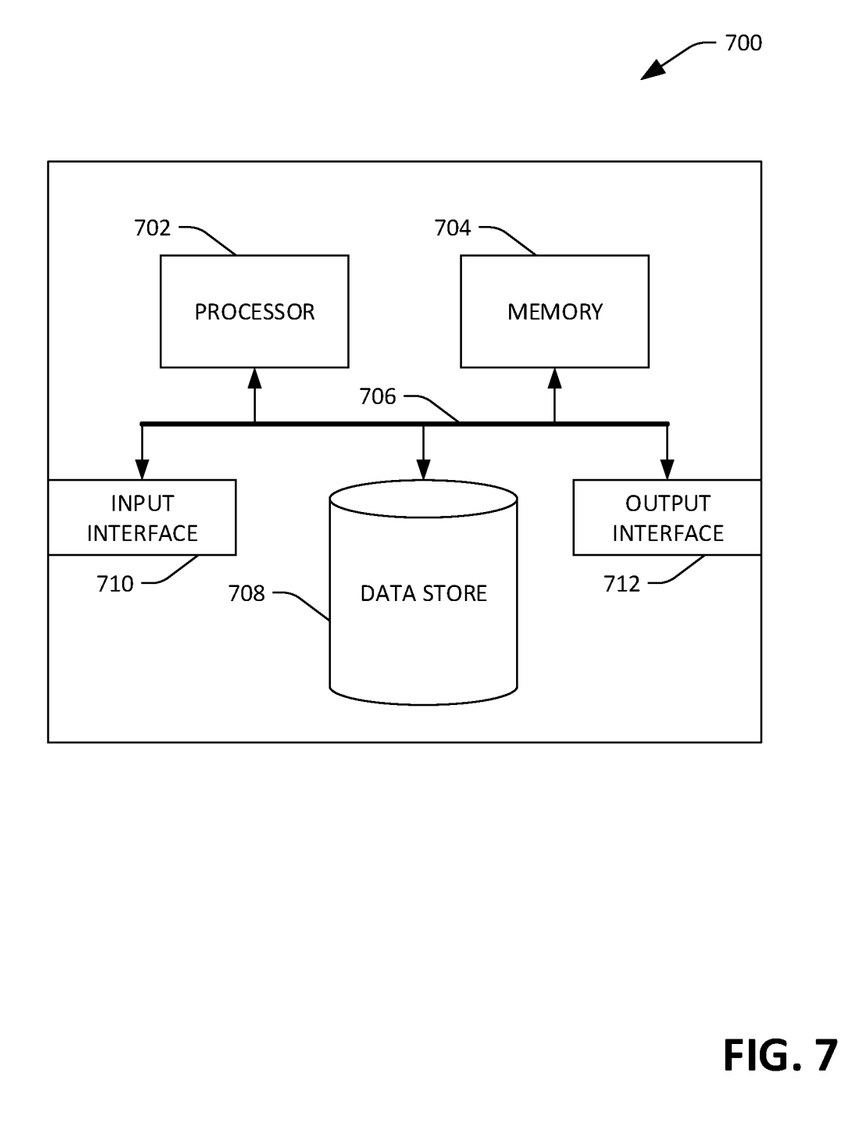
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 112 or the computing system 400. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also store point cloud data, vectors of output features for points in a point cloud, segmentation data, training data, etc.

The computing device 700 additionally includes a data store 708 that is accessible by the processor 702 by way of the system bus 706. The data store 708 may include executable instructions, sensor data, output feature vector data, training data, segmentation data, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the engine 106, the braking system 108, and/or the steering system 110 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle (AV) comprising:
an engine;
a braking system;
a steering system;
a lidar sensor; and
a computing system that is in communication with the engine, the braking system, the steering system, and the lidar sensor, wherein the computing system comprises:
a processor; and
memory that stores instructions that, when executed by the processor, cause the processor to perform acts comprising:
receiving lidar data, the lidar data based upon output of the lidar sensor, the lidar data comprising a plurality of points representative of positions of objects in a driving environment of the AV;

assigning respective labels to a first point and a second point in the points based upon output of a deep neural network (DNN), wherein the labels indicate that the first point and the second point are representative of a same object in the driving environment, the output of the DNN comprises a first vector of features that is assigned to the first point and a second vector of features that is assigned to the second point, wherein the labels are assigned based upon a distance between the first vector and the second vector; and controlling at least one of the engine, the braking system, or the steering system during operation of the AV in the driving environment based upon the labels assigned to the first point and the second point.

2. The AV of claim 1, wherein the labels are assigned based upon determining that the distance between the first vector and the second vector is below a pre-defined distance threshold value.

3. The AV of claim 1, the acts further comprising assigning respective labels to a third point and a fourth point in the points based upon a distance between a third vector and a fourth vector being above a pre-defined distance threshold value, the third vector comprising a plurality of features pertaining to the third point that are output by the DNN and the fourth vector comprising a plurality of features pertaining to the fourth point that are output by the DNN, the labels assigned to the third point and the fourth point indicating that the third point and the fourth point represent different objects.

4. The AV of claim 1, the acts further comprising generating a proposed segmentation of the plurality of points based upon the labels assigned to the first point and the second point and the output of the DNN, wherein the proposed segmentation comprises data indicating, for each point in the points, a group to which the point belongs, wherein each group of points is representative of a different object in the driving environment, the first point and the second point belonging to a first group of points in the proposed segmentation, the first group of points representative of a first object.

5. The AV of claim 4, the acts further comprising:
determining that a third point indicated in the proposed segmentation as belonging to the first group of points is not representative of the first object; and
updating the proposed segmentation data to indicate that the third point does not belong to the first group of points.

6. The AV of claim 5, wherein determining that the third point is not representative of the first object is based upon a mean of feature values of vectors assigned to points in the first group of points, the vectors being vectors output by the DNN.

7. The AV of claim 5, wherein determining that the third point is not representative of the first object is based upon a variance of feature values of points in the first group of points.

8. The AV of claim 1, wherein the first point comprises a position vector indicative of a three-dimensional position of the first point, the position vector being distinct from the first vector.

9. A method for controlling operation of an autonomous vehicle (AV), comprising:
receiving lidar data from a lidar sensor mounted on the AV, the lidar data comprising a plurality of points representative of positions of objects in a driving environment of the AV;
assigning respective labels to a first point and a second point in the points based upon a first vector and a second vector that are output by a deep neural network (DNN), wherein the labels indicate that the first point and the second point are representative of a same object in the driving environment, wherein the first vector is assigned to the first point and comprises a plurality of first feature values output by the DNN, and wherein the second vector is assigned to the second point and comprises a plurality of second feature values output by the DNN; and
controlling at least one of an engine, a braking system, or a steering system of the AV during operation of the AV in the driving environment based upon the labels assigned to the first point and the second point.

10. The method of claim 9, wherein the assigning the respective labels is based further upon a distance between the first vector and the second vector.

11. The method of claim 10, wherein the labels are assigned based upon determining that the distance between the first vector and the second vector is below a pre-defined distance threshold value.

12. The method of claim 9, wherein the output of the DNN comprises a respective vector of features for each of the points in the plurality of points, the acts further comprising assigning respective labels to a third point and a fourth point in the points based upon a distance between a third vector and a fourth vector being above a pre-defined distance threshold value, the third vector comprising features pertaining to the third point and the fourth vector comprising features pertaining to the fourth point, the labels assigned to the third point and the fourth point indicating that the third point and the fourth point represent different objects.

13. The method of claim 9, the acts further comprising generating a proposed segmentation of the plurality of points based upon the labels assigned to the first point and the second point and the output of the DNN, wherein the proposed segmentation comprises data indicating, for each point in the points, a group to which the point belongs, wherein each group of points is representative of a different object in the driving environment, the first point and the second point belonging to a first group of points in the proposed segmentation, the first group of points representative of a first object.

14. The method of claim 13, the acts further comprising:
determining that a third point indicated in the proposed segmentation as belonging to the first group of points is not representative of the first object; and
updating the proposed segmentation data to indicate that the third point does not belong to the first group of points.

15. The method of claim 14, wherein determining that the third point is not representative of the first object is based upon a mean of feature values of vectors assigned to points in the first group of points, the vectors being vectors output by the DNN.

16. The method of claim 14, wherein determining that the third point is not representative of the first object is based upon a variance of feature values of points in the first group of points.

17. An autonomous vehicle (AV) comprising:
a computer-readable storage medium comprising instructions that, when executed by a processor, cause the processor to perform acts comprising:
  receiving a lidar point cloud from a lidar sensor system mounted on the AV, the lidar point cloud comprising a plurality of points representative of positions of objects in a driving environment of the AV;
  assigning respective labels to a first point and a second point in the points based upon a first vector of features output by a deep neural network (DNN) and a second vector of features output by the DNN, the first vector of features including a plurality of first features pertaining to the first point, the second vector of features including a plurality of second features pertaining to the second point, the DNN trained such that a distance between the first vector and the second vector is indicative of whether the first point and the second point are representative of a same object, wherein the labels assigned to the first point and the second point indicate that the first point and the second point are representative of a same object in the driving environment; and
  controlling at least one of an engine, a braking system, or a steering system of the AV during operation of the AV in the driving environment based upon the labels assigned to the first point and the second point.

18. The AV of claim 17, the acts further comprising:
subsequent to assigning the labels to the first point and the second point, excluding the first point from a first group of points that are labeled as being representative of the same object, wherein points in the first group of points are each assigned a vector of features that are output by the DNN, the excluding the first point based upon the first features and features associated with another point in the first group of points.

19. The AV of claim 18, the acts further comprising:
responsive to excluding the first point from the first group, assigning the first point to a second group of points that are representative of a second object in the driving environment.

20. The AV of claim 18, wherein assigning the first point to the second group is based upon at least one of a position of a third point in the second group of points or a third vector of features assigned to the third point.

* * * * *